United States Patent

Bridigum

[15] 3,707,209
[45] Dec. 26, 1972

[54] CAM ARRANGEMENT FOR BRAKE HEAD POSITION ADJUSTMENT

[72] Inventor: Robert J. Bridigum, Pittsburgh, Pa.

[73] Assignee: Westinghouse Air Brake Company, Wilmerding, Pa.

[22] Filed: July 19, 1971

[21] Appl. No.: 163,960

[52] U.S. Cl................................188/220.6, 188/197
[51] Int. Cl. .............................................B61h 13/38
[58] Field of Search ..188/196 M, 196 V, 197, 220.1, 188/220.6, 221.1

[56] References Cited

UNITED STATES PATENTS

| | | | |
|---|---|---|---|
| 950,486 | 3/1910 | Koenig | 188/220.6 |
| 1,056,358 | 3/1913 | Murray | 188/220.6 |
| 2,918,149 | 12/1959 | McClure et al. | 188/197 |

*Primary Examiner*—Duane A. Reger
*Attorney*—Ralph W. McIntire, Jr.

[57] ABSTRACT

This invention relates to a cam arrangement for varying the angular position of the braking surface of a brake assembly brake shoe relative to the tread surface of a railway car wheel.

A brake head having a brake shoe secured to one side by a brake shoe key has extending from its opposite side a pair of parallel spaced-apart flanges between which is disposed the end of a brake rod that is pivotally connected to the brake head by a pin, the opposite ends of which are anchored in coaxial bores provided in these flanges.

The pivoted end of the brake rod is provided with a flat surface that abuts intermediate its ends a flat leaf-type brake head positioning spring that has one end anchored to a pin, the opposite ends of which are also anchored in coaxial bores provided in these flanges. A third pin, having its opposite ends anchored in these flanges, has eccentrically and rotatably mounted thereon a polyhedron cam. Manual rotation of this cam by means of a wrench brings one or another face of the cam into contact with the lower end of the positioning spring to thereby rotate the brake head relative to the brake rod to adjust the arcuate braking surface of the brake shoe relative to the arcuate tread surface of the car wheel until the centers of these two arcuate surfaces are coaxial to provide even wear of the brake shoe and prevent the upper end thereof from contacting or dragging on the tread of the wheel when a brake application is released.

5 Claims, 2 Drawing Figures

PATENTED DEC 26 1972 3,707,209

INVENTOR.
ROBERT J. BRIDIGUM
BY Ralph W. McIntire, Jr.

ATTORNEY

CAM ARRANGEMENT FOR BRAKE HEAD POSITION ADJUSTMENT

BACKGROUND OF THE INVENTION

One tread brake assembly is provided for each wheel of a four-wheel two-axle railway passenger car truck. Each brake assembly is suitably secured, as by a plurality of cap screws, to a sprung member of the car, such as the center sill of the truck frame, which rests on a plurality of springs that are supported on a pair of equalizers. These equalizers are disposed one on each side of the car truck and are supported at their respective opposite ends by the two journal boxes on the corresponding side of the car truck. The plurality of cap screws extend through smooth bores in bosses that are integral with the casing section of the brake assembly and have screw-threaded engagement with internally threaded bores provided therefore in the sprung member, such as the center sill. A plus or a minus tolerance of a chosen amount is allowed for the location of these screw-threaded bores. Accordingly, if these bores are located in the exact desired location, when the brake assembly is secured to the center sill or other sprung member of the car truck, the center of the arcuate braking surface of the brake shoe and the center of the tread surface of the car wheel will be coaxial while this braking surface is in braking contact with the tread surface of the wheel. However, if these screw-threaded bores are not in the exact desired location but their location is within the allowed tolerance therefor, it is evident that when the brake assembly is secured to the sprung part of the truck by the plurality of cap screws, the center of the braking surface of the brake shoe and the center of the tread surface of the wheel will not be coaxial. Therefore, upon effecting a brake application, one end or the other of the arcuate braking surface of the brake shoe will be brought into contact with the tread surface of the wheel before the remaining portion of this arcuate surface. Consequently, uneven wear of the brake shoe will result which of course is undesirable.

Accordingly, it is the general purpose of this invention to provide a cam arrangement whereby, subsequent to securing a brake assembly to a car truck, the angular position of the arcuate braking surface of a brake shoe can be adjusted relative to the tread surface of the car wheel so that the centers of these arcuate surfaces are substantially coaxial while these surfaces are in braking contact one with the other.

SUMMARY OF THE INVENTION

According to the present invention, a polyhedron cam is eccentrically and rotatably mounted on a pin, the opposite ends of which are anchored in spaced-apart parallel flanges integral with a brake head, so that any selected side of the cam can be rotated into contact with one side of a flat leaf-type brake head positioning spring adjacent one end thereof. Intermediate its ends this spring abuts a flat surface formed on the exterior end of the brake rod of the brake assembly and the other end is anchored to a pin, the ends of which are carried in the flanges of the brake head. Consequently, manual rotation of the cam is effective to rock the brake head and brake shoe carried thereby about their pivotal connection with the brake rod to thereby change the angular position of the arcuate braking surface of the brake shoe until the center of this braking surface substantially coincides with the center of the car wheel while the shoe is in braking contact with the wheel.

Figure 1:
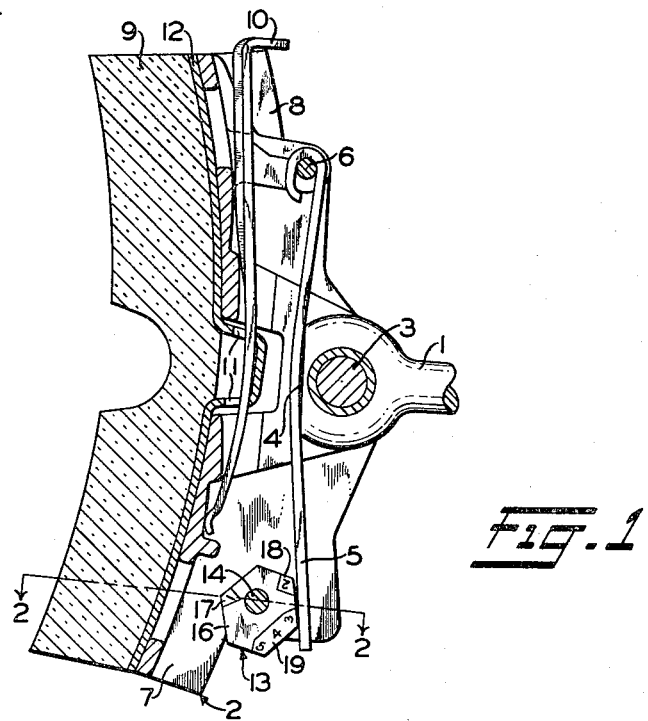
FIG. 1 is a vertical cross-sectional view, taken along the line 1—1 of FIG. 2 and looking in the direction of the arrows, showing a brake-shoe-carrying brake head pivotally connected to one end of a brake rod and a manually rotatable cam for varying the angular position of the brake head and shoe relative to the brake rod.

As shown in FIG. 1 of the drawing, one end of a brake rod 1 of a tread brake assembly (not shown) is pivotally connected to the lower end of a brake head hanger (not shown) and a brake head 2, as by a headed pin 3 and a cotter pin (not shown). The left-hand end of the brake rod 1 is provided, as shown in FIG. 1, with a flat surface 4 against which is disposed a flat leaf-type brake head positioning spring 5. The upper end of this spring 5 is bent around a pin 6 that has its opposite ends anchored in a pair of spaced-apart parallel flanges 7 and 8 (FIG. 2) that extend from one side of the brake head 2.

A brake shoe 9, preferably of the flanged composition type, as shown, for movement into braking contact with the tread surface of a wheel (not shown), is secured to the brake head 2 by a brake shoe key 10 that extends through a slot 11 provided therefor in a backing plate 12 that is cast or molded integral with the brake shoe 9.

Figure 2:
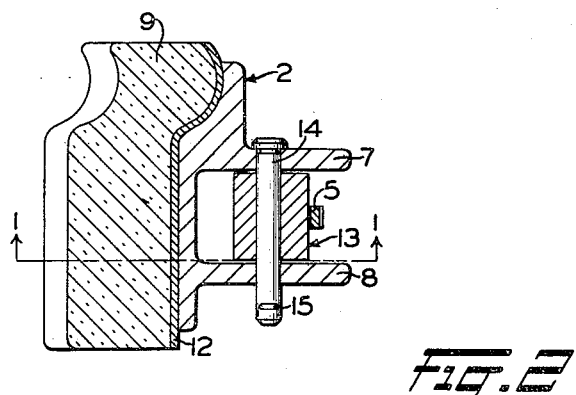
FIG. 2 is a cross-sectional view, taken along the line 2—2 of FIG. 1 and looking in the direction of the arrows, showing further structural details.

As best shown in FIG. 2, a positioning cam 13 is disposed between the flanges 7 and 8 of the brake head 2. As shown in FIGS. 1 and 2, this cam 13 is eccentrically and rotatably mounted on a headed pin 14 that extends through coaxial bores provided therefor in the flanges 7 and 8 and is retained in place by a cotter pin 15 that extends through a bore in this pin adjacent the lower end thereof.

The positioning cam 13 may be a casting in the form of a polyhedron having a top and a bottom face and six sides. One of these faces, which is indicated in FIG. 1 by the reference numeral 16, is provided with three recesses 17, 18 and 19 in each of which is disposed indicia. Disposed in the recess 17 is the numeral 1 which is of such height as to be flush with the face 16, it being understood that this numeral is cast integral with the positioning cam 13. In like manner, the recess 18 is provided with the numeral 2 and the recess 19 with the numerals 3, 4 and 5. These numerals denote five of the six sides of the positioning cam 13. As shown in FIG. 1, the side of the positioning cam 13 denoted by the numeral 3 abuts the lower end of the leaf-type brake head positioning spring 5.

Since the positioning cam 13 is eccentrically mounted on the pin 14, it can be seen from FIG. 1 that if this cam 13 is manually rotated clockwise, by means such as, for example, a wrench, the side denoted by the numeral 3 will be moved out of abutting contact with the relatively stiff brake head positioning spring 5 and the side denoted by the numeral 2 will be moved into abutting contact with this spring 5 thereby decreasing the distance from the center of the pin 14 to the spring 5 and causing the brake-shoe-carrying brake head 2 to rock counterclockwise about the pin 3 to change the angular position of the arcuate braking surface of the brake shoe 9 with respect to the tread surface of the car wheel.

Likewise, if the cam 13 is manually rotated counterclockwise, the side denoted by the numeral 3 will be moved out of abutting contact with the spring 5 and the side denoted by the numeral 4 will be moved into abutting contact with this spring 5 thereby increasing the distance from the center of the pin 14 to the spring 5 and causing the brake-shoe-carrying brake head 2 to rock clockwise about the pin 3 to change the angular position of the arcuate braking surface of the brake shoe 9 with respect to the tread surface of the car wheel.

From the foregoing, it is apparent that if, subsequent to securing a brake assembly to a railway car truck, it is found that the center of the arcuate braking surface of the brake shoe 9 and the center of the car wheel are not coaxial, the positioning cam 13 can be manually rotated in the appropriate direction to bring another one of the faces of this cam into abutting contact with the spring 5 and thus change the angular position of the arcuate braking surface of the brake shoe 9 with respect to the tread surface of the car wheel until, while these surfaces are in braking contact one with the other, the centers of these arcuate surfaces are substantially coaxial.

Having now described the invention, what I claim as new and desire to secure by Letters Patent, is:

1. Positioning means for adjusting the position of a brake-shoe-carrying brake head having a pair of parallel spaced-apart flanges between which is disposed one end of a brake rod on which said brake head is pivotally mounted by a pin extending through said brake rod, the opposite ends of said pin being anchored in said flanges, said positioning means comprising:
    a. a polyhedron cam member two of which faces are parallel, said cam member being so disposed between said flanges that said two parallel faces are substantially parallel to said flanges, said cam member having an eccentrically located bore therein that at its respective opposite ends terminates at said two parallel faces,
    b. a pin extending through said bore in said cam member and having its opposite ends anchored in said flanges, and
    c. a leaf-type spring anchored at one end to said brake head and adjacent its other end abutting one face of said cam member, the intermediate portion of said spring abutting said one end of said brake rod whereby rotation of said cam member to bring a selectable one of the faces thereof into abutting relationship with said spring effects rocking of said brake-shoe-carrying brake head relative to said brake rod to change the position of said brake head and brake shoe carried thereby relative to said brake rod.

2. Positioning means, as recited in claim 1, further characterized in that one of said two parallel faces is provided with indicia indicating other faces of said polyhedron cam member.

3. Positioning means, as recited in claim 1, further characterized in that one of said two parallel faces is provided with a plurality of recesses in each of which recesses is indicia indicating another face of said polyhedron cam member.

4. Positioning means, as recited in claim 1, further characterized in that said polyhedron cam member comprises a plurality of pairs of parallel faces, and said cam member is so disposed with respect to said flanges of said brake head that, while one face of one pair of faces abuts said leaf-type spring, the jaws of a wrench are receivable on the respective parallel faces of another pair of said plurality of pairs of parallel faces.

5. Positioning means, as recited in claim 2, further characterized in that said cam member is so disposed with respect to said flanges of said brake head that indicia indicating at least one of said other faces is always exposed to view by being disposed below the end of said flanges.

* * * * *